United States Patent
Peltier et al.

(10) Patent No.: US 6,887,935 B2
(45) Date of Patent: May 3, 2005

(54) MODIFIED POLYMERIC FLOCCULANTS WITH IMPROVED PERFORMANCE CHARACTERISTICS

(75) Inventors: Jeffrey H. Peltier, Wayne, PA (US); Stephen R. Vasconcellos, Doylestown, PA (US); Michael R. Wood, Philadelphia, PA (US)

(73) Assignee: GE Betz, Inc., Trevose, PA (US)

( * ) Notice: Subject to any disclaimer, the term of this patent is extended or adjusted under 35 U.S.C. 154(b) by 0 days.

(21) Appl. No.: 10/816,758

(22) Filed: Apr. 2, 2004

(65) Prior Publication Data

US 2004/0192840 A1 Sep. 30, 2004

Related U.S. Application Data

(63) Continuation of application No. 10/287,236, filed on Nov. 4, 2002, now abandoned.

(51) Int. Cl.$^7$ .............................................. C08L 31/00
(52) U.S. Cl. ........................ 524/829; 524/555; 524/827
(58) Field of Search ................................ 524/555, 827, 524/829

(56) References Cited

U.S. PATENT DOCUMENTS

| | | | |
|---|---|---|---|
| 3,235,490 A | 2/1966 | Goren | |
| 3,284,393 A | 11/1966 | Vanderhoff et al. | |
| 3,601,039 A | 8/1971 | Schover | |
| 3,698,037 A | 10/1972 | Johnson | |
| RE28,576 E | 10/1975 | Anderson et al. | |
| 3,975,266 A | 8/1976 | Baize | |
| 4,396,513 A | 8/1983 | Haldeman | |
| 4,661,259 A | 4/1987 | Walterick, Jr. et al. | |
| 4,705,640 A | 11/1987 | Whittaker | |
| 4,981,936 A | * 1/1991 | Good et al. | ................. 526/287 |
| 5,006,596 A | 4/1991 | Chen et al. | |
| 5,037,863 A | 8/1991 | Kozakiewicz et al. | |
| 5,171,808 A | 12/1992 | Ryles et al. | |
| 5,626,718 A | 5/1997 | Philippe et al. | |
| 5,807,489 A | 9/1998 | Farinato et al. | |
| 5,840,804 A | 11/1998 | Carl et al. | |
| 6,117,938 A | 9/2000 | Farinato et al. | |
| 6,294,622 B1 | 9/2001 | Barajas et al. | |
| 6,579,417 B1 | 6/2003 | Hund et al. | |
| 6,605,674 B1 | 8/2003 | Whipple et al. | |

FOREIGN PATENT DOCUMENTS

| | | |
|---|---|---|
| DE | 37 33 587 | 4/1988 |
| EP | 0264710 | * 10/1986 |
| EP | 8711 4585.0 | 4/1988 |
| EP | 0 494 554 A | 7/1992 |
| JP | 2002-233708 | 8/2002 |
| WO | WO 97/34945 | 9/1997 |
| WO | WO 01/55228 | 8/2001 |
| WO | WO 02/02662 | 1/2002 |
| WO | WO 02/32965 | 4/2002 |

* cited by examiner

*Primary Examiner*—Helen L. Pezzuto
(74) *Attorney, Agent, or Firm*—Wegman Hessler & Vanderbury

(57) ABSTRACT

Methods for the preparation of high molecular weight cationic poly(meth) acrylamide/quaternary ammonium salt copolymers are disclosed wherein after at least about 50% of the monomers have been polymerized, a cross-linking agent is then added to the reaction mixture on a continuous basis and in the absence of any feed of chain transfer agent. Cationic copolymers so produced exhibit improved floc formation properties and are useful as flocculants and dewatering aids in aqueous systems that include an oily sludge or the like.

17 Claims, No Drawings

MODIFIED POLYMERIC FLOCCULANTS WITH IMPROVED PERFORMANCE CHARACTERISTICS

CROSS-REFERENCE TO RELATED APPLICATION

The present application is a continuation application of Ser. No. 10/287,236 field Nov. 4, 2002 now abandoned. The entire disclosure of the aforementioned parent application is incorporated by reference herein.

FIELD OF THE INVENTION

The present invention is directed to materials and methods for the preparation of high molecular weight, acrylic-based, water-soluble polymers. More particularly, the present invention relates to certain cationic, acrylamide-based polymers that are prepared by adding a structural modifier after about 50% conversion of the monomers has occurred, and their use as flocculants and dewatering agents.

BACKGROUND OF THE INVENTION

The problems associated with the separation of suspended solids from industrial process waters are well known to those skilled in the art. For example, see the background of the invention section of U.S. Pat. No. 3,601,039.

One such means of enhancing the settling or filtration of suspended solids from aqueous media is by chemical treatment. In particular, the chemical treatment process used to enhance the dewatering of activated sludge, which is typically anionic in nature, is described by the addition of a cationic flocculant to the sludge while agitating the sludge. The flocs that form are then subjected to a dewatering operation. This treatment process consists of neutralizing the negative electric charge of the sludge by the addition of a positively charged flocculent, the subsequent formation of small flocs, followed by the agglomeration of the small flocs into larger flocs that settle out of solution prior to the dewatering operation. For example, the use of polyamines as cationic flocculants for thickening and dewatering operations is taught in U.S. Pat. No. 3,975,266.

One objective of improving the flocculation process is to attain better dewatering performance by the formation of larger, sturdier flocs. U.S. Pat. No. 3,235,490 teaches the use of various chemical additives including certain polymers of acrylamide cross-linked with N,N'-methylenebisacrylamide. The polymers are claimed to flocculate the suspended solids in an aqueous media by capture of fine particles within the structured polymer network. However, '490 teaches that said copolymers are only effective as cationic flocculants under acidic or neutral conditions.

U.S. Pat. No. 3,698,037 teaches a method of releasing water from activated sludge utilizing cross-linked, cationic emulsion copolymers.

U.S. Pat. No. 4,705,640 teaches that the flocculation performance of certain cross-linked, cationic acrylamide dispersion copolymers is improved by subjecting the polymer solution to mechanical shear prior to application.

U.S. Pat. No. 6,294,622 B1 teaches the process for the preparation of certain cross-linked, cationic acrylamide emulsion copolymers that exhibit improved flocculation performance without the use of mechanical shear. The process described for preparing the cationic acrylamide copolymers comprises polymerizing the monomers while adding the cross-linking agent (chain-branching agent) continuously to the mixture throughout the course of the reaction. Furthermore, '622 teaches that said addition of the cross-linking agent must begin before about 50%, preferably about 25% of the monomer conversion is achieved.

The prior processes as exemplified by U.S. Pat. No. 6,294,622, exhibit the potential to produce a polymer with a higher degree of cross-linking resulting from the continuous addition of a cross-linking agent over the extent of the entire polymerization reaction.

Higher cross-linking may result in the reduction in the net cationic charge available for neutralization of the negative charge on the substrate by trapping or shielding a portion of the charge within the three-dimensional polymer network. Moreover, the process shows a further shortcoming in that, although the polymers formed possess a larger molecular weight relative to their linear counterparts, their net size, or measure of true hydrodynamic volume, is compromised. The interlocking nature of the extensively bound polymer network prevents full dispersion or extension into solution, particularly within the limited time of the application.

WO 02/02662 A1 is directed to structurally modified water-soluble polymers made via polymerization of an aqueous solution of monomers under free radical polymerization conditions. At least one structural modifier is added to the polymer solution after at least 30% polymerization of the monomers has occurred. The so-called structural modifiers can comprise either a chain transfer agent and/or a cross-linking agent. As is apparent from Ex. 7 of this publication, when a cross-linking agent is added alone in the later stages of the reaction, as the only structural modifier, it is always shot fed (i.e., added all at once in a single treatment). However, as shown in Tables 29 and 25, when the cross-linking agent is fed over time, it is always fed in combination with a chain transfer agent (i.e., "co-fed" with a molecular weight modifying agent).

SUMMARY OF THE INVENTION

We have found that improved floc ratings are shown for cationic acrylamide/quaternary ammonium salt copolymers when such copolymers are produced by a process that requires continuous addition of the cross-linking agent to the polymerization reaction medium after about 50% or more of monomer to polymer conversion has occurred, while no concurrent addition of any chain transfer agent to the reaction mixture is made. Additionally, it is preferred that during the polymer initiation step, no cross-linking or chain transfer agent should be present.

Cationic acrylamide/quaternary ammonium salt copolymers made by the process can be used in amounts of 1–2000 ppm, preferably 10–200 ppm, (based on one million parts of the aqueous medium) to improve dewatering of aqueous suspensions containing sludge, such as oily sludge.

DETAILED DESCRIPTION

This invention provides a high molecular weight, water-soluble polymer that exhibits improved flocculating performance. A process for preparing the polymer is presented. In the process, a polymerization reaction mixture is provided that comprises one or more acrylic monomers. Polymerization of the acrylic monomers in the reaction mixture is initiated in the absence of any chain branching or cross-linking agents, or any chain transfer agents. A chain branching or cross-linking agent is, however, added to the reaction mixture continuously, at the end of the polymerization reaction, preferably right before the polymerization reaction is substantially completed. Typically, the chain branching agent or cross-linking agent is a water-soluble multifunctional monomer having at least two unsaturated groups. In a preferred embodiment, N,N'-methylenebisacrylamide, also referred to as MBA, is used as the chain branching agent or cross-linking agent. The MBA is added continuously after the polymerization reaction has achieved a total monomer conversion of about 50%–99%. Preferably, the MBA is added after 75% monomer conversion. The polymerization reaction can be conducted in inverse emulsion, solution, or by a precipitation polymerization process.

In accordance with the invention, it has been discovered that cationic (meth) acrylamide/quaternary ammonium salt copolymers having repeat units (x) and (y) as shown in Formula I, prepared by the process described herein, are effective in separating suspended solids from aqueous media.

Formula I

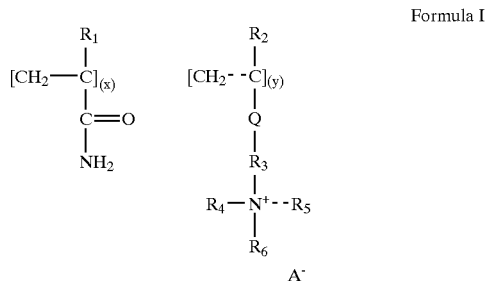

In Formula I above, the molar ratio of repeat units (x):(y) may vary from 95:5 to 5:95 with the molar ratio (x):(y) of 60:40 being presently preferred. $R_1$ and $R_2$ are the same or different and are chosen from H and $CH_3$. Q is —C(O)O—, —OC(O)—, or —C(O)NH—, $R_3$ is branched or linear (C1–C4) alkylene; $R_4$, $R_5$ and $R_6$ are independently chosen from H, C1–C4 linear or branched alkyl, or an C5–C8 aromatic or alkylaromatic group; A is an anion selected from $Cl^-$, $Br^-$, $HSO_4^-$, or $MeOSO_3^-$.

At present the preferred repeat units (y) are as follows:
1—(AETAC)—2-acryloxyethyltrimethyl ammonium chloride; also referred to as dimethylaminoethylacrylate methyl chloride; in terms of Formula I above $R_1$=H; $R_2$=H; Q is —C(O)O—, $R_3$=Et; $R_4$, $R_5$ and $R_6$ are all Me and A is Cl—
2—(MAPTAC)—3-(meth) acrylamidopropyltrimethyl ammonium chloride; in terms of Formula I above $R_1$=H; $R_2$=$CH_3$; Q is —C(O)NH—; $R_3$=Pr, $R_4$ $R_5$ and $R_6$ are all Me and A is $Cl^-$
3—(METAC)—2-methacryloxyethyltrimethyl ammonium chloride; in terms of Formula I above $R_1$=H; $R_2$=$CH_3$, Q is —C(O)O—; $R_3$ is Et and $R_4$, $R_5$ and $R_6$ are all Me and A is $Cl^-$ The presently preferred copolymer that is made by the method described herein is a 60:40 mole percent copolymer of acrylamide/AETAC that is cross-linked as explained hereinafter. The degree of cross-linking is relatively minor and can amount from about $1 \times 10^{-4}\%$ to about $5 \times 10^{-3}\%$ based upon 100 molar percent of the repeat units (x) and (y) present.

The resulting molecular weight of the resulting cross-linked copolymers may vary over a wide range, e.g., 10,000–20,000,000. The invention, however, finds its greatest usefulness when the acrylamide copolymers have molecular weights in excess of 1,000,000. The copolymer should, however, be water-soluble.

The copolymers are prepared by a water-in-oil emulsion technique. Such processes have been disclosed in U.S. Pat. Nos. 3,284,393 and 5,006,596 herein incorporated by reference. The technique comprises:

Preparation of an aqueous phase, typically ranging from about 50% to about 90% by weight of the total emulsion, which aqueous phase is comprised of water, monomers as described above, chelating agents and initiator(s), if the particular initiator(s) chosen are water-soluble. Ethylenediamine tetraacetic acid or diethylenetriamine pentaacetic acid and their salts are suitable, but not limiting, chelating agents. The water-soluble initiator may be selected from peroxides, persulfates, and bromates. Sulfites, bisulfites, sulfur dioxide, and other reducing agents used with oxidizing initiators to form an initiating redox pair may also be used. If a reducing agent or a water-soluble azo-type, thermal initiator such as 2,2'-azobis-(2-amidinopropane) dihydrochloride, is used, it is added as described below. The total amount of monomers will range from about 30% to about 80%, by weight, based on the total weight of the aqueous phase.

Preparation of an oil phase, ranging from about 10% to about 50% by weight of the total emulsion, which oil phase is comprised of a liquid organic hydrocarbon and water-in-oil emulsifying agents. A preferred group of hydrocarbon liquids include aliphatic compounds. Oils commonly used for this purpose are the hydrotreated petroleum distillates, such as the commercially available materials sold under the trademarks of Vista LPA-210, Shellsol D100S, and Exxsol D100S. The oil phase may optionally contain the initiator(s), if the particular initiator(s) chosen are oil-soluble. Typical oil-soluble, thermal initiators would be 2,2'-azo-bis (isobutyronitrile), 2,2'-azobis (2,4-dimethylvaleronitrile) and benzoyl peroxide, and the like. It is well known to those skilled in the art that the initiator(s) can be chosen to be either water- or oil-soluble depending on the particular needs of the system.

The water-in-oil emulsifying agent is usually a low HLB surfactant. Typical emulsifiers are mono and digylcerides, sorbitan fatty acid esters and lower N,N-dialkanol substituted fatty amides, and the like, and are described in U.S. Pat. No. Re. 28,576.

A mixture of emulsifying surfactants, rather than single emulsifier, may be preferred. The concentration of emulsifier can be from about 3% to about 30% by weight, based on the total weight of the oil phase. Polymeric surfactants such as modified polyester surfactants (Hypermer, ICI) and maleic anhydride-substituted ethylene copolymers (PA-14 or 18, Chevron) may also be added to improve the mechanical stability and increase the solids content of the emulsion.

After the aqueous phase and oil phase have been prepared separately, the aqueous phase is then homogenized into the oil phase. Homogenizers, high shear pumps, or high-speed agitators that are capable of mixing the two phases into a homogeneous water-in-oil emulsion may be used. Any of the techniques to prepare the inverse emulsions well known to those skilled in the art may be used. Typically, the particle size of the resulting emulsion is between 10 µm and 2 µm. After the emulsion is prepared, the system is then sparged with nitrogen to remove all oxygen from the system. The emulsion is under constant agitation or circulation. Polymerization is then initiated by adding a reducing agent from a red-ox pair or by heat to induce the decomposition of a thermal initiator in the emulsion after its addition. The temperature of the reaction medium is maintained at about 20° C. to about 75° C., preferably about 35° C. to about 55° C.

As is stated elsewhere, during the initiation step, it is preferred that this be conducted in the absence of a cross-linking agent or chain transfer agent. $^{13}C$ NMR techniques can be utilized to assess the degree of conversion of the monomers into the copolymer. After waiting until about greater than 50% or more of the conversion has occurred, the cross-linking agent is then added continuously to the reaction mixture in the absence of addition of any chain transfer agent. Most preferably the cross-linking agent is added continuously after the polymerization reaction has achieved a total monomer conversion of from about 75%–99%, more preferably 80%–95%.

As to the cross-linking agents that can be used, these are well known in the art and function to provide cross-linked polymers in which a branch or branches from one polymer molecule are effectively linked or attached to other polymer molecules. The preferred cross-linker is N,N'-methylenebisacrylamide (MBA) but a host of other cross-linking agents such as divinylbenzene, diethylene glycol diacrylate, propylene glycol dimethacrylate, diallylfumarate, propylene glycol dimethacrylate, allylacrylate, diallylfumarate and vinylalkoxy silanes may also be mentioned.

The cross-linking agent may be added in an amount of about 1 ppm to about $5 \times 10^{-4}$ ppm based on the total amount of the reaction mixture. In a preferred embodiment, MBA is added in an amount of about 1–500 ppm, preferably from about 2 to about 150 ppm, more preferably from about 3 to about 50 ppm and most preferably from about 4 to about 12 ppm based on total monomers.

The polymers of the present invention should be added to an aqueous media containing suspended solids, for which improved flocculation performance is desired, in an amount effective for the purpose. In a preferred embodiment of the invention the aqueous media is a biologically activated sludge from a secondary wastewater treatment facility.

The method of the invention has shown particular promise in centrifugal separation techniques wherein the polymer is admitted to an aqueous suspension of oily sludge to improve dewatering of the suspension in a centrifuge. The polymers made in accordance with the invention can be employed in combination with conventional water treatment additives such as organic and/or in inorganic coagulants, flocculants and anti-forming agents.

The invention will be described in conjunction with the following examples that should not be construed to limit the invention but should be viewed for illustrative purposes only.

EXAMPLES

Example 1

This example illustrates the synthesis of a 60:40 mol % acrylamide:dimethylaminoethylacrylate methyl chloride quaternary salt copolymer in water-in-oil emulsion. To a suitable reaction flask equipped with a condenser, a thermometer, a nitrogen inlet, and an overhead mechanical agitator, were added 111.2 grams of Shellsol D100S, 6.0 grams of sorbitan monooleate, and 4.6 grams of oleic isopropanolamide as steric stabilizers. The mixture was then stirred rapidly with a magnetic stirrer for 15 minutes. An aqueous phase was prepared separately, which contained 140.7 grams of 53 wt % acrylamide (AM), 169.9 grams of 80 wt % dimethylaminoethylacrylate methyl chloride quaternary salt (AETAC), 31.9 grams of de-ionized water, 0.6 grams of 40 wt % diethylenetramine pentaacetic acid pentasodium salt, and 1.8 grams of 1 wt % potassium bromate. The solution was further adjusted with 1.0 grams of 10 wt % sulfuric acid to pH 5.0. The aqueous phase mixture was stirred rapidly with a magnetic stirrer for 15 minutes. The aqueous phase was then transferred to the flask containing the oil phase and both phases were homogenized to a stable emulsion with an 8000-rpm, 200-watt homogenizer for 30 seconds. The reactor was then configured for operation under reflux conditions. The emulsion was agitated at 600 rpm and continuously sparged using 0.5 Liters per minute of nitrogen at ambient temperatures for 50 minutes. Once the 50-minute nitrogen sparge period was complete, 0.3 grams of 0.7 wt % aqueous tertiary-butyl hydroperoxide (t-BHP), an oxidizing agent, were added through a septum in the top of the sealed reactor. Mixing and sparging of the emulsion continued for an additional 10 minutes. The polymerization was then initiated by slowly adding 7.0 grams of 0.5 wt % aqueous sodium metabisulfite (SMBS), a reducing agent, to the reactor starting at a rate of 0.055 milliliters per minute. A temperature increase of 2° C. (exotherm) indicated that the polymerization reaction had initiated under ambient conditions. The reaction temperature was allowed to increase from 25° C. to 45° C. over a period of 15 minutes, and was then maintained at 48° C. for 2 hours. At the end of the 2-hour period the total monomer conversion was 84%, the polymerization temperature decreased by 1° C., and then 2.2 grams of 0.05 wt % aqueous N.N'-methylenebisacrylamide (MBA) was added continuously to the reactor at a rate of 0.111 milliliters per minute. After completion of the addition of the MBA and 0.5 wt % SMBS feeds, 2.4 grams of 5 wt % aqueous SMBS were then added to the rector starting at a rate of 0.300 milliliters per minute. After completion of the 5 wt % SMBS feed, 0.3 grams of 0.7 wt % aqueous t-BHP were then added to the reactor. The reaction mixture was stirred for 2 minutes and then 4.7 grams of 28 wt % SMBS was added to the reactor starting at a rate of 0.300 milliliters per minute. After cooling, 16.3 grams of a blend of ethoxylated C-12–14 secondary alcohols and sulfosuccinic acid, 1,4-bis(2-ethylhexyl) ester, sodium salt, were added to the emulsion as inverting surfactants. The resultant inverse-emulsion contained 42 wt % of active material. The polymer in aqueous solution had an intrinsic viscosity of 12.44 dL/g and a standard viscosity of 23.1 cps as measured in 1M NaCl at 25° C. using a Brookfield Programmable DV-II+ with a UL adapter at 12 RPM. These characteristics are summarized in Table 1.

Comparative Example 2—C-2

This example illustrates the formation of prior art 60:40 mol % acrylamide:dimethylaminoethylacrylate methyl chloride quaternary salt copolymers at 42% active material in water-in-oil emulsion, in which the methylenebisacrylamide (MBA) is added to the polymerization reaction in a batch manner. This cationic emulsion polymer was obtained using the conditions of Example 1 with the MBA totally added to the aqueous phase prior to homogenization and the start of the reaction. The MBA was prepared in de-ionized water at a concentration of 500 ppm. An aliquot of this solution was added to the aqueous phase to prepare water-in-oil emulsion of 5 ppm of MBA. The intrinsic viscosity and standard viscosity are also listed in Table 1.

Comparative Example 3—C-3

This example illustrates the formation of prior art 60:40 mol % acrylamide:dimethylaminoethylacrylate methyl chloride quaternary salt copolymers at 42% active material in water-in-oil emulsion, in which methylenebisacrylamide (MBA) is added to the polymerization reaction all at once as a single treatment. This cationic emulsion polymer was obtained using the conditions of Example 1, except that a solution of MBA is added the reaction mixture in one shot after 72% monomer conversion. The MBA was prepared in de-ionized water at a concentration of 500 ppm. An aliquot of this solution was added to the reaction mixture to prepare water-in-oil emulsion of 5 ppm of MBA. The intrinsic viscosity and standard viscosity are also listed in Table 1.

Comparative Example 4—C-4

This example illustrates the formation of prior art 60:40 mol % acrylamide:dimethylaminoethylacrylate methyl chloride quaternary salt copolymers at 42% active material in water-in-oil emulsion, in which methylenebisacrylamide (MBA) is added to the polymerization reaction in a continuous manner. This cationic emulsion polymer was obtained using the conditions of Example 1, except that a solution of MBA is added to the reaction mixture continuously from the initiation of polymerization until a total monomer conversion of 94%. The MBA was prepared in de-ionized water at a concentration of 500 ppm. An aliquot of this solution was added to the reaction mixture to prepare water-in-oil emulsion of 5 ppm of MBA. The intrinsic viscosity and standard viscosity are also listed in Table 1.

Example 5—Ex-5

This example illustrates the formation of a 60:40 mol % acrylamide:dimethylaminoethylacrylate methyl chloride quaternary salt copolymer at 42% active material in water-in-oil emulsion, in which methylenebisacrylamide (MBA) is added to the polymerization reaction in a continuous manner. This cationic emulsion polymer was obtained using the conditions of Example 1, except that a solution of MBA is added the reaction mixture in a continuous feed after 77% monomer conversion. The MBA was prepared in de-ionized water at a concentration of 500 ppm. An aliquot of this solution was added to the reaction mixture to prepare water-in-oil emulsion of 5 ppm of MBA. The intrinsic viscosity and standard viscosity are also listed in Table 1.

TABLE 1

| Example | Monomer Conversion ($^{13}$C NMR) | MBA Feed Time (minutes) | Standard Viscosity (centipoides) | Intrinsic Viscosity (dL/gram) | Weight % Cationic Charge (isoelectric end pt) |
|---|---|---|---|---|---|
| Ex 1 | 84% | 20 min | 23.1 | 12.44 | 50.76 |
| C-2 | 0% | 0 min | 8.4 | 11.03 | 45.72 |
| C-3 | 72% | 0 min | 12.5 | 11.70 | 49.16 |
| C-4 | 0%–94% | 155 min | 14.2 | 12.92 | 44.85 |
| Ex-5 | 77% | 30 min | 20.2 | 8.908 | 49.93 |

Example 6—Efficacy Results—LSCST

For evaluating the performance of the example polymers previously described as flocculants and dewatering agents, the following laboratory scale centrifuge simulation test (LSCST) was developed and utilized:

1. Untreated substrate was obtained from the feedstock of a centrifuge application.
2. An acceptable polymer dosage was determined based on the polymer treatment established for the application.
3. The example emulsion polymer samples from the present invention were made down in de-ionized water to 0.3 wt % solids.
4. A variable speed mixer capable of attaining a maximum speed of 2000 RPM was set up with a 2-inch diameter turbine impeller.
5. The mixer speed was set to 1600 RPM.
6. A wide mouth plastic bottle was graduated for 200 ml.
7. For each test, a 200-ml aliquot of untreated sludge was poured into the graduated plastic bottle. The prescribed amount of polymer treatment was then added to the untreated substrate.
8. The bottle containing the treated mixture was placed below the impeller, the mixer was then turned on, the bottle was raised to submerge the impeller in the mixture, and the mixture was stirred for the designated amount of time, the bottle was lowered, and then the mixer was turned off.
9. The following guidelines were then used to quantitatively rank the stability of the flocculated substrate.

Rating Guidelines
Floc size
5=very large flocs (diameter>5 mm)
4=good flocs (diameter 4–5 mm)
3=medium flocs (diameter 2–3 mm)
2=small flocs (diameter 1 mm)
1=pin flocs (diameter<1 mm)
0=no flocs Table 2 summarizes the floc stability ranking for the polymers of the present invention relative to the other example polymers not of this invention (i.e., the $C_2$–$C_4$ comparative polymers). Untreated substrate typically does not form any floc after being stirred and therefore its floc size rating is 0 by definition. Addition of the polymers of the present invention to the substrate dramatically improved the floc quality after stirring as was evidenced by the maintained floc size over time relative to the other treatments. All polymers tested were dosed at 75 ppm.

TABLE 2

| Example | 5 Seconds Floc Rating | 7 Seconds Floc Rating | 10 Seconds Floc Rating | 12 Seconds Floc Rating | 15 Seconds Floc Rating |
|---|---|---|---|---|---|
| Ex 1 | 4 | 3.5 | 3.5 | 3.5 | 2.5 |
| C-2 | 2 | 1 | 0.5 | 0.5 | 0 |
| C-3 | 3 | 3 | 3 | 3 | 2.0 |
| C-4 | 3 | 2 | 1 | 0.5 | 0 |
| Ex 5 | 3.5 | 3.5 | 3.5 | 3.0 | 2.5 |

As stated above, the cross-linked cationic, acrylamide/quaternary ammonium salt copolymers made by the processes set forth above are added to an aqueous medium that includes organic matter therein, such as oily sludge. The copolymers may be admitted to any such media in an amount of from about 1–2,000 ppm based upon one million parts of the medium. Preferably, the copolymer is admitted to such media in the amount of about 50–200 ppm. Use of the copolymers in such systems improves floc formation, thus enhancing separation of the floc from the aqueous phase via conventional treatment techniques such as by flotation, belt presses, centrifuges and the like.

In accordance with the patent statutes, the best mode of practicing the invention has been herein set forth. However, it will be apparent to those skilled in the art that modifications can be made in the methods herein disclosed without departing from the spirit of the invention. It is to be understood that the scope of the invention is to be limited solely by the scope of the appended claims.

What is claimed is:

1. Improved method for preparing a cross-linked water soluble cationic (meth) acrylamide/quaternary ammonium salt copolymer that is useful as a flocculant, said method comprising 1) initiating polymerization of an aqueous reaction mixture comprising (meth) acrylamide monomers and quaternary ammonium salt monomers to convert said monomers into a copolymer containing reaction mixture comprising cationic poly (meth) acrylamide/quaternary ammonium salt copolymer; and 2) cross-linking said copolymer by addition of a cross-linking agent to said copolymer containing reaction mixture; wherein said step of 2) cross-linking comprises waiting until about 50% or more of said monomers have been converted into said copolymer and then continuously adding between about 1 ppm to about 500 ppm of said cross-linking agent to said copolymer containing reaction mixture based on the total amount of said reaction mixture in the absence of concurrent addition of any chain transfer agent to said copolymer containing reaction mixture.

2. Improved method as recited in claim 1 wherein in step 1) no chain branching or chain transfer agent is added to said aqueous reaction mixture.

3. Improved method as recited in claim 1 wherein said cationic poly (methacrylamide)/quaternary ammonium salt copolymer has repeat units of the formula

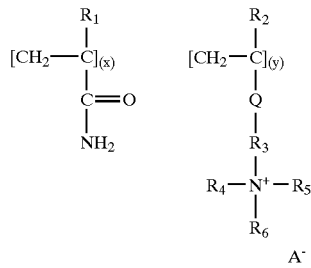

wherein Q is —C(O)O—, —OC(O)—, or —C(O)NH—, $R_3$ is branched or linear ($C_1$–$C_4$) alkylene; $R_4$, $R_5$ and $R_6$ are independently chosen from H, $C_1$–$C_4$ linear or branched alkyl, or an $C_5$–$C_8$ aromatic or alkylaromatic group; A is an anion selected from $Cl^-$, $Br^-$, $HSO_4^-$, or $MeOSO_3^-$.

4. Improved method as recited in claim 3 wherein the molar ratio of repeat units (x):(y) is from about 80–20(x): 20–80(y).

5. Improved method as recited in claim 4 wherein the molar ratio of repeat units (x):(y) is from about 60–40(x): 40–60(y).

6. Improved method as recited in claim 3 wherein said repeat unit y is AETAC.

7. Improved method as recited in claim 3 wherein said repeat unit y is MAPTAC.

8. Improved method as recited in claim 3 wherein said repeat unit y is METAC.

9. Improved method as recited in claim 1 wherein said copolymer is water-soluble and has a molecular weight of about 10,000–20,000,000.

10. Improved method as recited in claim 9 wherein said copolymer has a molecular weight of greater than about 1,000,000.

11. Improved method as recited in claim 10 wherein said copolymer is acrylamide/AETAC and wherein the motor ratio of acrylamide:AETAC is about 60:40.

12. Improved method as recited in claim 11 wherein said cross-linking agent is N,N'-methylenebisacrylamide.

13. Method of dewatering an aqueous suppression of the type including organic matter dispersed therein, said method comprising adding from about 1–2,000 ppm of a cross-linked water soluble cationic (meth)acrylamide/quaternary ammonium salt copolymer made in accordance with claim 1 to said aqueous suspension, based upon one million parts of said suspension, forming flocs containing said organic matter and separating said flocs from said aqueous system.

14. Method as recited in claim 13 wherein said aqueous suspension is contained within a centrifuge and said organic matter is oily sludge, said cross-linked water soluble cationic (meth)acrylamide/quaternary salt copolymer comprising a copolymer selected from the group consisting of acrylamide/AETAC; acrylamide/MAPTAC; and acrylamide/METAC copolymers and wherein said separating comprises centrifugal separation.

15. Method as recited in claim 14 wherein said water soluble cationic (meth)acrylamide/quaternary salt copolymer is acrylamide/AETAC.

16. Improved method as recited in claim 1 wherein said step 2) comprises waiting until about 75% or more of said monomers have been converted into said copolymer and then continuously adding said cross-linking agent to said copolymer containing reaction mixture in the absence of concurrent addition of any chain transfer agent to said copolymer containing reaction mixture.

17. Improved method as recited in claim 16 wherein said step 2) comprises waiting until about 80% or more of said monomers have been converted into said copolymer and then continuously adding said cross-linking agent to said copolymer containing reaction mixture in the absence of concurrent addition of any chain transfer agent to said copolymer containing reaction mixture.

* * * * *